June 18, 1957
G. W. McLELLAN
2,795,954
GAUGING DEVICE FOR LIQUIDS UNDER PRESSURE
Filed Feb. 10, 1955
3 Sheets-Sheet 1
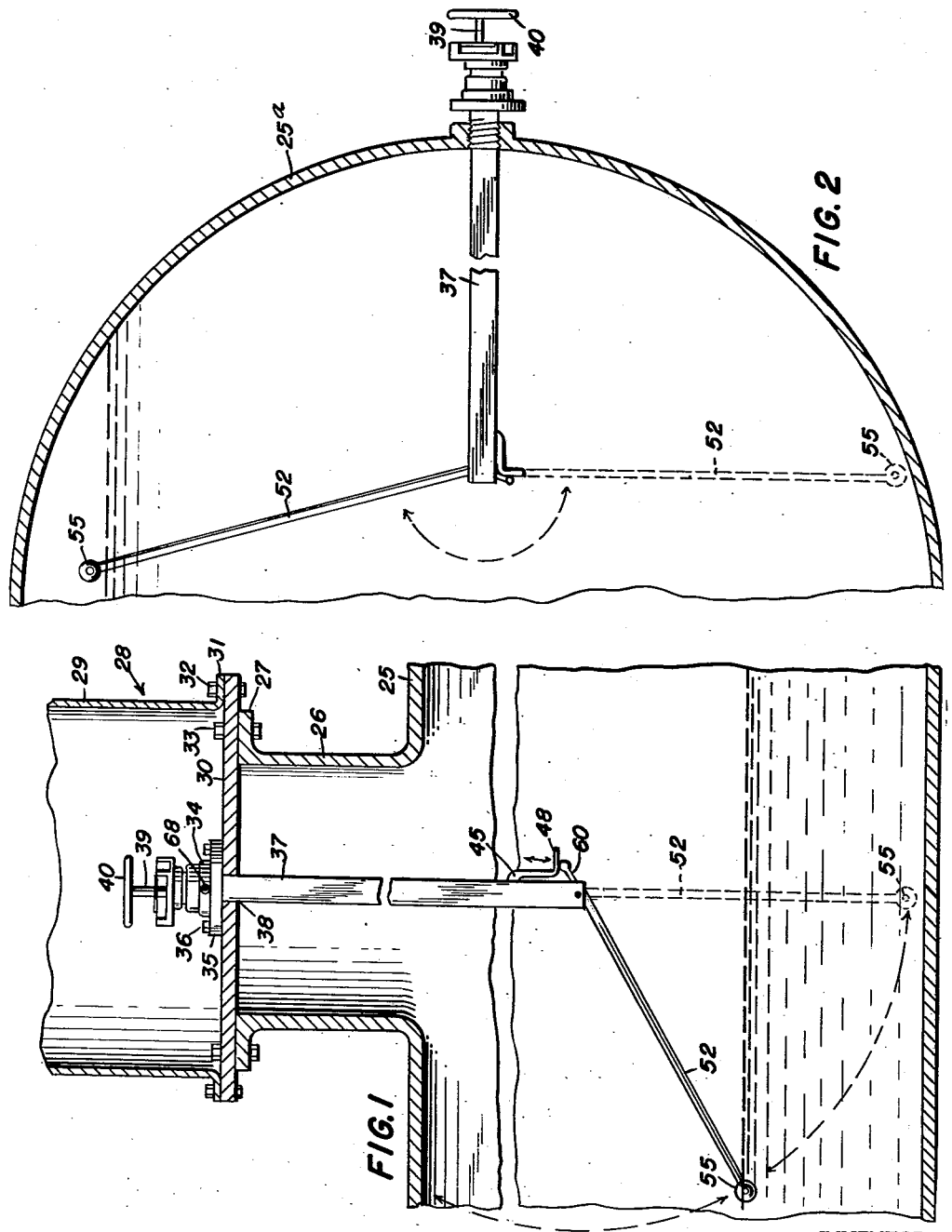
INVENTOR
GEORGE W. McLELLAN
BY
ATTORNEY

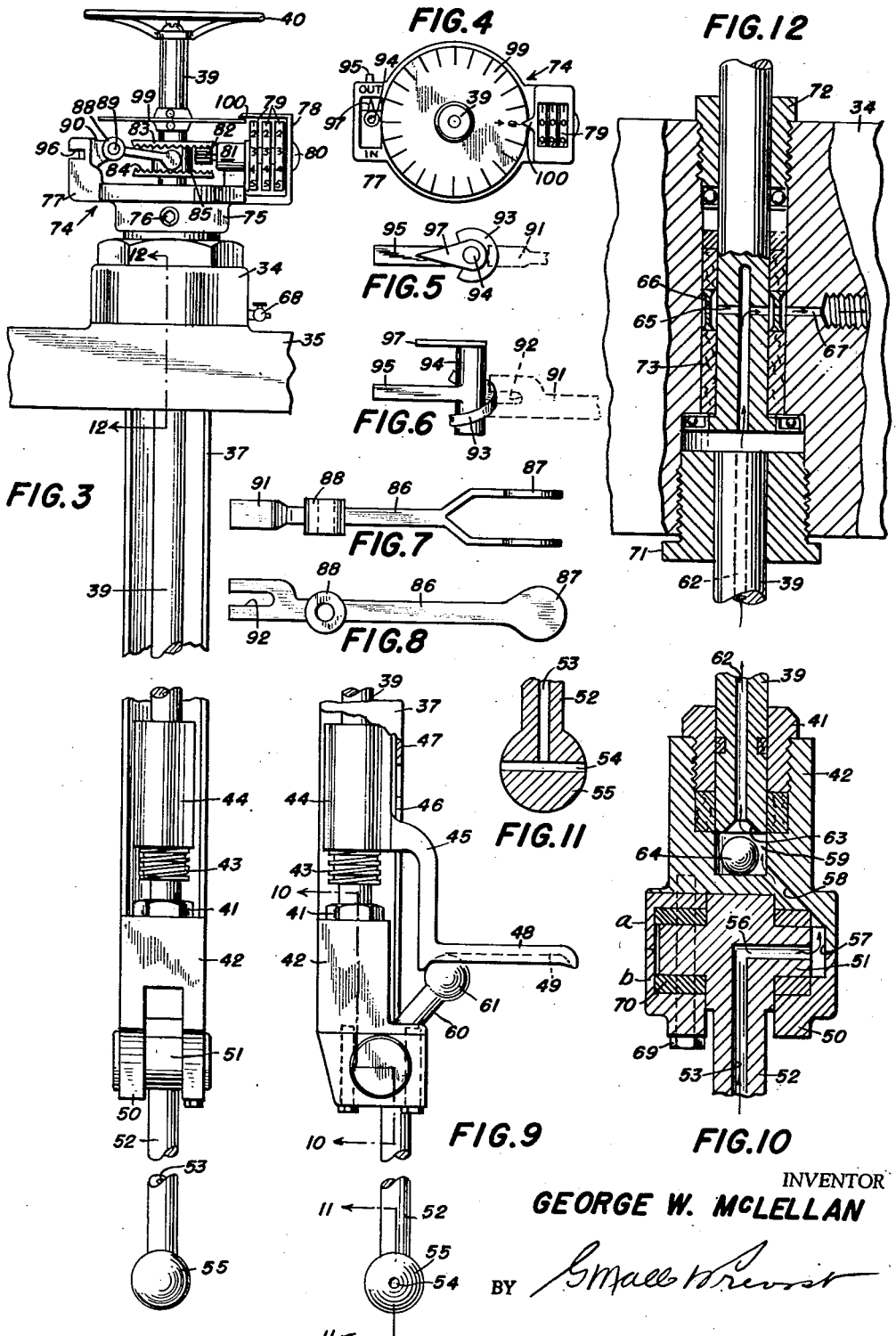

June 18, 1957 G. W. McLELLAN 2,795,954
GAUGING DEVICE FOR LIQUIDS UNDER PRESSURE
Filed Feb. 10, 1955 3 Sheets-Sheet 3
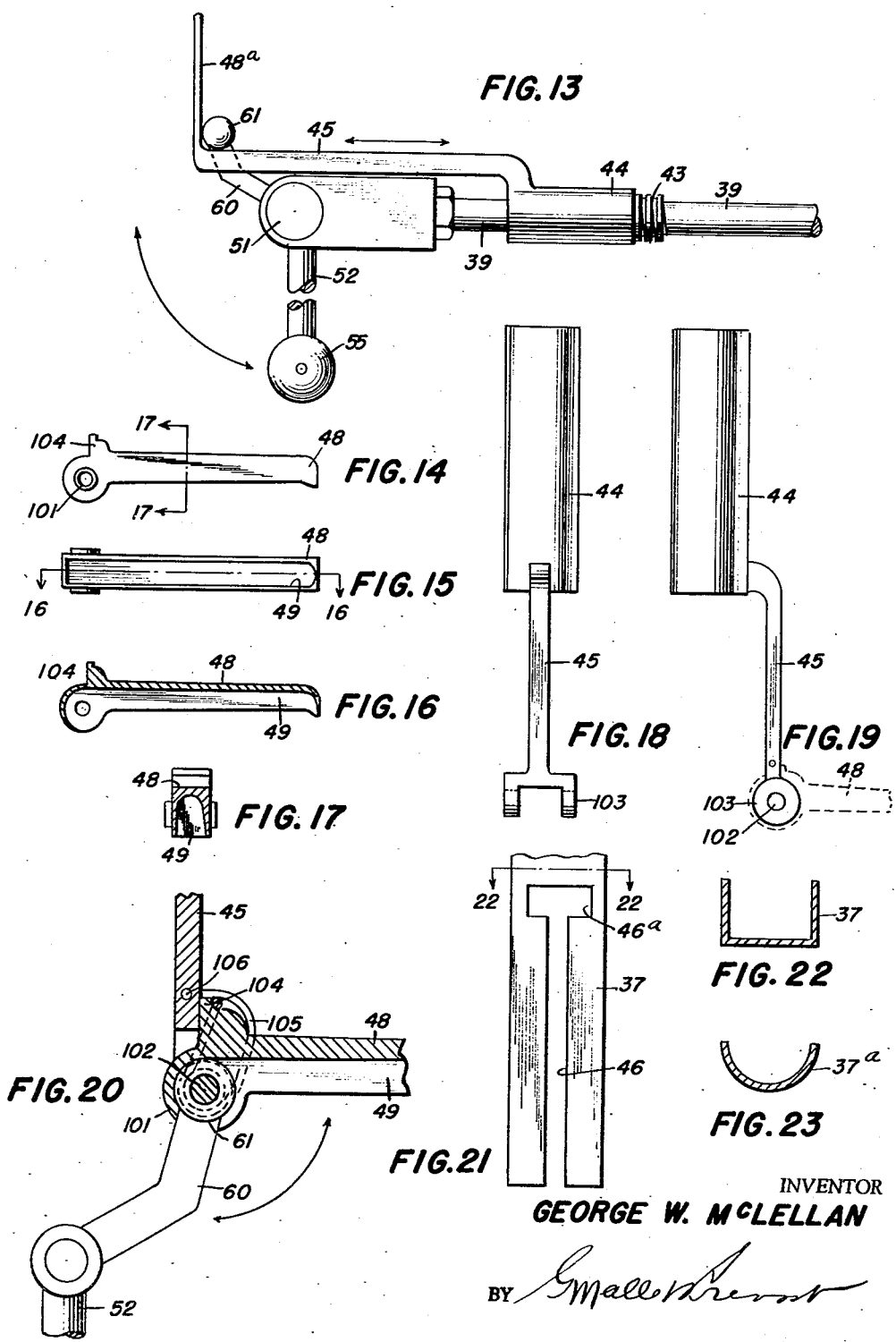
INVENTOR
GEORGE W. McLELLAN
BY
ATTORNEY United States Patent Office 2,795,954
Patented June 18, 1957

2,795,954
GAUGING DEVICE FOR LIQUIDS UNDER PRESSURE

George W. McLellan, Bartlesville, Okla.

Application February 10, 1955, Serial No. 487,350

13 Claims. (Cl. 73—298)

This invention relates to liquid level gauges for use in connection with tanks, tank cars, tank trucks and the like, for containing liquid under pressure, and consists more particularly in new and useful improvements in a gauging device comprising a mechanical liquid-vapor interface detector associated with visual calibrated indicating means denoting the volume of liquid contained in a tank or the volume of liquid which has been withdrawn from such tank.

An object of the invention is to provide a gauging device of this type which may be readily installed in conventional tanks or liquid containing vessels either of the horizontal or vertical types and comprising an adjustable sensing device adapted to be manipulated to detect the liquid-vapor interface in the tank, means being provided for operation in response to the adjusting motion of the sensing device, to indicate the location of said interface.

Another object of the invention is to provide a gauging device of this character, equipped with a reversing gear mechanism associated with the indicating means, whereby the latter is adapted to indicate either the volume of liquid contained in a tank, where the "in" measurements are being determined, or the volume of space above the liquid level in the tank, where the "out" measurements are being taken.

A further object of the invention is to provide a gauging device such as above referred to, which is adapted to be suspended vertically through the access opening in the top of the tank or inserted horizontally or at any angle, through an opening in the side wall of the tank.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1 is a fragmentary sectional view showing the gauging device applied to a conventional tank by suspending the device vertically through the dome or access opening in the top wall of the tank.

Figure 2 is a similar view of a modified adaptation, showing the gauging device installed horizontally through the side wall of a tank.

Figure 3 is an enlarged elevational view of the vertical type installation.

Figure 4 is a top plan view of the device, with the adjusting wheel removed to show the calibrated disc and indicating mechanism.

Figure 5 is a top plan view, still further enlarged, illustrating the indicator reversing control.

Figure 6 is a view in side elevation, of the control device shown in Figure 5.

Figure 7 is an enlarged top plan view of the gear shifting fork for the indicating mechanism.

Figure 8 is a view in side elevation, of the fork shown in Fig. 7.

Figure 9 is an elevational view taken at right angles to Fig. 3, illustrating the lower end of the gauge mechanism and its sensing element.

Figure 10 is an enlarged transverse sectional view taken on line 10—10 of Figure 9, showing the fluid passage arrangement leading from the sensing element.

Figure 11 is a sectional view taken on line 11—11 of Fig. 9, through the ball end of the sensing device.

Figure 12 is an enlarged view of the upper portion of the gauging device, partially in section, illustrating the fluid venting passage.

Figure 13 is an elevational view of the sensing end of the gauging device of the horizontal type.

Figure 14 is an enlarged view in side elevation, illustrating a modified hinged type control arm for the sensing element.

Figure 15 is a bottom plan view of the device shown in Figure 14.

Figure 16 is a longitudinal sectional view taken on line 16—16 of Figure 15.

Figure 17 is a transverse sectional view taken on line 17—17 of Fig. 14.

Figure 18 is an elevational view of the control arm mounting.

Figure 19 is a similar view taken at right angles to Fig. 18.

Figure 20 is an enlarged sectional view of the hinged control arm showing its relationship to the actuating lever of the sensing element.

Figure 21 is a fragmentary plan view of the body extension which supports the gauging device.

Figure 22 is a transverse sectional view taken on line 22—22 of Figure 21, and

Figure 23 is a similar view showing a modified form of body extension.

In the drawings, referring first to Figure 1, 25 represents a conventional tank having a dome 26 in its upper wall, provided with the usual supporting flange 27 bounding its upper annular edge. A conventional dome closure 28 may be provided, comprising annular side walls 29 and a bottom 30, the lower edge of the side walls being flanged as at 31, to receive bolts 32 for securing the same around the circular edge of the bottom 30. The bottom 30 may be bolted as at 33 to the flange 27 of the dome 26, all in the usual manner.

The gauging device proper comprises a base or body member 34, terminating in an annular horizontal mounting flange 35 adapted to be bolted as at 36 on the upper face of the closure bottom 30. A supporting channel 37 extends concentrically from the bottom of the body flange 35, through an opening 38 in the dome closure bottom 30 and in the form shown in Fig. 1, is suspended vertically through the dome 26 into the tank 25 for supporting the operating parts of the gauging device as will later appear.

As best seen in Figure 3, wherein the channel 37 is shown at right angles to the disclosure in Fig. 1, a vertical shaft 39 extends concentrically through the body 34 from the exterior of the tank closure, and carries at its upper extremity an operating wheel 40. The lower portion of the shaft 39 lies within the channel 37 with its lower end rotatably supported in a suitable fixture 41 on a base member 42 carried at the lower end of the channel. Slightly above its lower end, the shaft 39 carries a series of external threads 43 adapted to register with complementary internal threads in an annular traveler sleeve member 44 whereby, upon rotation of the rod 39 in either direction, the sleeve 44 is adapted to move longitudinally on the rod within the channel 37. As seen in Fig. 9 the sleeve 44 carries a radially projecting operating arm 45 which projects through and is adapted to move within a vertical slot 46 in the web 47 of the channel 37. The arm 45 terminates at its lower end in a shoe 48 which projects at right angles to the axis of the channel 37 and rod 39, its under side being recessed as at 49 to form a track or guideway for the operating lever of the sensing device as will later appear.

In Fig. 3, it will be seen that the lower end of the base member 42 is bifurcated as at 50 and transversely recessed to receive the trunnion 51 which serves as a fulcrum for the swing tube or sensing device 52. The swing tube 52 is provided with a central longitudinally extending passageway 53 communicating at its lower extremity with a transverse passageway 54 extending through a ball end 55 integral with the lower end of the swing tube. The upper end of the longitudinal passageway 53 is diverted at right angles as at 56 and opens at one end of the trunnion 51 into a connecting chamber 57 which in turn communicates with an angular passageway 58 leading to a ball valve chamber 59 in the central portion of the body 42. As will be described later, this series of passageways is designed to conduct the fluid entering the sensing device, to the exterior of the tank through the shaft 39.

From Fig. 9 it will be seen that an operating lever 60 having a ball end 61 is formed integrally with the trunnion 51 and swing tube 52 and is arranged at an angle with respect to the swing tube so that when the latter is in its normal inactive vertical position, the ball end of the operating lever 60 will lie within the recess 49 in the underside of the shoe 48 at the extremity thereof nearest the gauge assembly. Thus, upon the rotation of the hand wheel 40 and the shaft 39, the threaded portion 41 of the latter will cause the sleeve 44 to move vertically and either rise or descend on the shaft 39. The descending movement of the sleeve 44 carries with it the operating arm 45 whereupon the shoe 48 engages the ball 61 on the lever 60, rocking this integral structure so that the ball end 55 of the swing tube 52 will partake of a clockwise rotary movement through the arc shown by the arrow in Figure 9. It will be understood that the length of the swing tube 52 is such that during the course of its arcuate movement, its ported ball end can traverse the entire vertical extent of the tank 25. Thus it is possible by proper manipulation of the hand wheel 40, to adjust the vertical position of the ball end 55 of the swing tube to intersect the liquid-vapor interface in the tank.

Turning now to Figures 10 and 12, it will be seen that the shaft 39 is provided with an axial passageway 62 which opens at its lower end into the ball valve chamber 59, where it is provided with a flaring seat 63 for engagement by the ball 64 in the event of breakage or damage to the portion of the gauge which extends outside the confines of the tank or vessel. The passageway 62 terminates at a point within the main body 34 where it is provided with a series of radially disposed passages 65 communicating with an annular space 66 surrounding the rod 39 within the body 34. From this annular space 66 a bleed passage 67 leads to a bleed valve 68 (Fig. 3) in the periphery wall of the body 34, whereby fluid entering the shaft 39 through the swing tube 52 may be bled to the exterior of the tank through the bleed valve 68.

In order to facilitate assembly of the device, the bifurcated end 50 of the face 42 may be made in sections a, b, secured together by bolts or the like 69. Suitable bearings 70 may be provided for the trunnion 51 to insure ease of operation.

The upper portion of the shaft 39 which extends through the body 34 is secured in place by suitable glands 71 and 72 with packing 73 serving to prevent leakage through the body 34.

The indicating device generally designated by the numeral 74, is mounted on the upper end of the body 34 by means of an annular collar 75 and a lock screw 76. The collar 75 is attached to and supports a yoke 77, carrying at one side the indicating mechanism, preferably of the type comprising a series of interconnected register wheels 79, mounted on a transverse axle 80. The axle 80 is supported in a bearing member 81 carried by the yoke 77 and its inwardly projecting end supports a pinion gear 82 rotatable about an axis lying at right angles to the axis of the shaft 39. The gauge shaft 39 carries a pair of opposed crown gears or wheels 83 and 84 mounted in vertically spaced relation on a central supporting sleeve 85 which slidably embraces the shaft 39. The oppositely disposed teeth of the crown wheels 83 and 84 are adapted to selectively engage the pinion gear 82 which is interposed therebetween and the central sleeve member 83 is splined to the shaft 39 so that upon rotation of the latter, both of the crown wheels 83 and 84 rotate therewith in the same direction. However, depending upon the vertical positioning of the double gear assembly on the shaft 39, the pinion gear 82 may be rotated either clockwise or counter-clockwise to correspondingly actuate the series of register wheels 79.

A suitable mechanism for shifting the opposed crown gears 83—84 may consist of an arm 86 bifurcated at one end as at 87, to provide a fork which embraces the sleeve member 85 with a suitable pivotal connection for shifting the latter vertically as will later appear. Intermediate the ends of the arm 86 is a bearing member 88 by means of which the arm 86 is pivotally mounted on a fulcrum 89 carried by a boss 90 supported on the side of the yoke 77 opposite the register wheel mechanism 78. The opposite end 91 of the arm 86 is slotted as at 92 to receive a spiral land 93 on the periphery of a vertically extending stud 94, rotatably supported in the upstanding thickened portion of the yoke 77. The stud 94 carries a radially projecting lug 95 adapted to traverse a slot 96 in the supporting portion of the yoke 77. The upper extremity of the stud 94 carries a pointer 97 which lies parallel with the lug 95, and the upper face of the support end of the yoke 77 is provided on one side with the symbol "In" and on the opposite side with the symbol "Out." The pointer 97 cooperates with these symbols to indicate whether the reversible gears 83—84 are set to measure the quantity of liquid in the tank or the quantity of liquid which has been withdrawn from the tank, as the case may be.

In the operation of this reversible gear mechanism, the rotation of the spindle or shank 94 by a suitable tool applied to the lug 95, causes the spiral land 93 operating in the slot 92, to rock the arm 86 on its fulcrum 89 either raising or lowering the forked end 87 which in turn causes engagement of the gear 83 or the opposite gear 84, with the pinion gear 82. Thus, if the hand wheel 40 and the shaft 39 are rotated in clockwise direction, with the gear 83 in engagement with the pinion gear 82, the latter is rotated in counter-clockwise direction to cause a corresponding rotation of the register wheels 79. However, if the shifting arm 86 is rocked upwardly, causing disengagement of the crown wheel 83 and engagement of the crown wheel 84 with the pinion gear 82, this same clockwise rotation of the shaft 39 causes the clockwise rotation of the register wheels 79. In either operation, the positioning of the respective crown wheels 83—84 is indicated by the pointer 87 and its relationship to the symbol on the top face of the yoke 77.

On a plane with the reading surface of the indicating device 78, there is attached a calibrated disc 99 which coacts with a fixed pointer 100 on the indicating device to register fractional measurements. It will be understood that the disc 99 is fixed to the shaft 39 and rotatable therewith.

In the operation of the form of invention just described, the swing tube 52 normally hangs by gravity in a vertical position as shown in Fig. 1 with its ball end 55 lying adjacent the bottom wall of the tank 25, in the dotted line position. When it is desired to determine the quantity of liquid remaining in the tank or having been charged to the tank, the lug 95 on the gear shift control is turned in counter-clockwise direction to shift the gear assembly so that the crown wheel 84 engages the pinion gear 82 with the pointer 97 adjacent the symbol "In." The hand wheel 40, and with it the shaft 39, is rotated to lower the sleeve 44 on the shaft 39 and the engagement of the descending shoe 48 with the ball end 61 of lever 60, causes the swing tube 52 to partake of an arcuate movement about its fulcrum 51. Meanwhile, the vent valve or bleed valve 68 has been opened and when the ball end 55 of the swing tube has been elevated to a point above the liquid level in the tank, the operator will observe that only vapor, instead of liquid is being bled from the valve 68. Then, by careful manipulation of the hand wheel 40 in the opposite direction, the swing tube will be lowered until its ball end 55 intersects the liquid-vapor interface in the tank. When this point is reached, the liqued under pressure will enter the port or passageway 54 in the ball end 55 and flow upwardly through the passageway 53, 58 and 62 until it emerges from the bleed valve 68.

By reversing the indicator gear mechanism to bring the top crown wheel 83 into engagement with the pinion gear 82, and following this same procedure, the operator can determine the volume of the space between the liquid level and the top wall of the tank, to ascertain the quantity of liquid which has been withdrawn from the tank.

As previously stated, this device is equally adaptable to horizontal installations such as shown in Figure 2. Here it will be seen that the gauge assembly is installed through the side wall of the tank 25a with the channel 37 lying in a horizontal plane. Otherwise, the operation of the mechanism is the same as that just described.

In the horizontal installation it will be noted that the swing tube 52 hangs by gravity at right angles to the channel 37 and a slightly different arrangement of the control arm 45 and shoe 48a is provided for operating the swing tube. It will be seen in Figure 13 that the fulcrum control lever 60 with the ball end 61 normally rides on the arm 45 at the base of the vertically extending shoe 48a. Upon rotation of the shaft 39 in clockwise direction, the sleeve 44 is caused to move to the right in this figure, whereupon the shoe 48a abuts the ball end 61 of lever 60 and rotates the lever and integral swing arm 52 in clockwise direction, elevating the ball end 55 of the swing tube. Upon the counter-clockwise rotation of the shaft 39 the weight of the swing tube 52 and its ball end 55 causes the counter-clockwise rotation of the swing tube until vertical position is reached. Thus, the same fine degree of measurement may be obtained in the horizontal installation.

The control arms 45 and shoes 48—48a in the forms of the invention previously referred to, are integral structures as will be seen from the drawings. However, in order to facilitate installation, it may be desirable to provide for a hinged action of the shoe with respect to the control arm. A suitable modification of the structure to accomplish this purpose is illustrated in Figures 14 to 20 where the shoe 48 is provided at one end with a transverse bearing 101 adapted to engage a pivot bar 102 carried by the bifurcated end 103 of the control arm 45 extending from the sleeve 44. An abutment 104 on the shoe engages the adjacent edge of the control arm 45 in the operative position of the shoe 48, as shown in Figure 20 and a spring member 105 fixed at one end at 106, to the control arm 45 with its opposite end engaging the outer face of the abutment 104, encircles the hinge connection 101—102 and normally exerts a counter-clockwise tension on the shoe 48, maintaining the abutment 104 in engagement with the face of the control arm 45. However, when the device is being installed for example, in a relatively small opening in the side wall of a horizontal tank, the shoe 48 can be swung clockwise on its pivot 102 during insertion in the opening and upon release, will automatically resume its right angular position due to the action of the spring 105.

It may be stated that the cross sectional profile of the channel 37 may be right angular as shown in Figure 22 or it may be semi-cylindrical as shown at 37a in Figure 23.

Also, to facilitate installation of the various parts, the upper end of the vertical slot 46 may be milled transversely as at 46a at its upper end.

It will thus be seen that I have provided a gauging device for storage and shipping vessels which is capable of adjustment to obtain minutely accurate readings both during the charging of the vessel with liquid and the withdrawal of liquid therefrom.

From the foregoing it is believed that the invention may be readily understood by those skilled in the art without further description, it being borne in mind that numerous changes may be made in the details disclosed without departing from the spirit of the invention as set forth in the following claims.

I claim:

1. A gauging device for locating the vapor-liquid interface in a vessel, comprising a sensing tube, means pivotally supporting said tube in a vessel with its free end normally lying adjacent the bottom of the vessel, a tubular shaft projecting into said vessel perpendicular to the axis of said pivotal tank and rotatably supported in a wall thereof, manually operated means exterior of said vessel for rotating said shaft, means actuated by the rotation of said shaft and movable in a line parallel with the axis thereof, for swinging said sensing tube about its pivot, to cause its suspended end to travel in an arc extending from the bottom to the top of the vessel, said sensing tube forming a fluid passageway terminating at the suspended end of the tube in communication with the interior of said vessel, to establish the location of the vapor-liquid interface means including said tubular shaft, for venting the opposite end of said passageway to the exterior of said vessel, a mechanical volume register exterior of said vessel correlating the location of the vapor-liquid interface with the volume being measured, and means operative by the rotation of said shaft for actuating said register.

2. A gauging device for locating the vapor-liquid interface in a vessel, comprising a sensing tube, means pivotally supporting said tube in a vessel with its free end normally lying adjacent the bottom of the vessel, a tubular shaft projecting into said vessel perpendicular to the axis of said pivotal support and rotatably supported in a wall of said tank, manually operated means exterior of said vessel for rotating said shaft, means actuated by the rotation of said shaft for swinging said sensing tube about its pivot to cause its free end to travel in an arc extending from the bottom to the top of the vessel, said sensing tube forming a fluid passageway terminating at the free end of the tube in communication with the interior of said vessel to establish the location of the vapor-liquid interface, means including said tubular shaft, for venting the opposite end of said passageway exterior of said vessel, a mechanical volume register exterior of said vessel, a driven gear for actuating said register, and a driving gear assembly operated by the rotation of said shaft for actuating said driven gear, said gears, correlating the location of the vapor-liquid interface with the volume of fluid being measured.

3. A gauging device as defined in claim 2, wherein said driving gear assembly is shiftable to reverse the direction of rotation of the driven gear, whereby said register may be selectively caused to indicate the volume of liquid in the tank or the volume of liquid which has been withdrawn therefrom.

4. A gauging device for locating the liquid-vapor interface in a receptacle, comprising a support adapted to be projected longitudinally into said receptacle through an opening in its wall, means retaining said support in said opening, a fluid conducting sensing tube swingably mounted at one end on the projected extremity of said support on an axis transverse to the longitudinal axis of the latter, whereby the free end of said tube may be rotated in a vertical arc, an inlet port in the free end of said tube, means defining a vent passageway connected to the other end of said tube and terminating in a valved vent outlet to the exterior of said receptacle, a manually operated adjusting element carried by said support and controlled from the exterior of said receptacle, said adjusting element including a member shiftable longitudinally on said support and having means engageable with said tube for swinging the latter on its axis to vary its radial position within an arc which intersects both the upper and lower containing limits of the receptacle, a mechanical register located externally of the receptacle and adapted to indicate the volume of fluid being measured, and means actuated by said adjusting element simultaneously with its swinging of said sensing tube to translate the extent of the movement of the sensing tube into volumetric dimensions on the register.

5. A gauging device for locating the vapor-liquid interface in a vessel, comprising a sensing tube, a support projected longitudinally into said vessel through an opening in its wall, pivotally suspending said tube on an axis perpendicular to the axis of said support, with its free end normally lying adjacent the bottom of the vessel, a tubular shaft projecting into said vessel and rotatably supported in a wall thereof, manually operated means exterior of said vessel for rotating said shaft, a traveler sleeve on said shaft, internally threaded to engage complementary threads on said shaft, means preventing rotation of said traveler sleeve upon rotation of said shaft, to cause the sleeve to shift longitudinally on said shaft, an actuating lever fixed to said sensing tube, an abutment on said traveler sleeve engaging said lever to rock said tube upon movement of the traveler sleeve and cause its free end to travel in an arc extending from the bottom of the vessel, said tube forming a fluid passageway terminating at its free end in communication with the interior of said vessel, means venting its opposite end exterior of said vessel, a mechanical volume register exterior of said vessel correlating the location of the vapor-liquid interface with the volume being measured, a driven gear for actuating said register, and a driving gear assembly operated by rotation of said shaft simultaneously with its shifting of said traveler sleeve for actuating said driven gear.

6. A gauging device as claimed in claim 5, wherein the abutment on said traveler sleeve comprises a laterally projecting shoe, and a ball end at the extremity of said lever adapted to be slidably engaged by said shoe.

7. Apparatus as claimed in claim 6, wherein said shoe is hingedly connected to said follower sleeve.

8. Apparatus as claimed in claim 6, wherein said shoe is hingedly connected to said traveler sleeve, and including spring means for normally maintaining said shoe in operative position.

9. Apparatus as claimed in claim 6, wherein said driven gear for actuating said register is a pinion gear and said driving gear assembly comprises a pair of vertically spaced crown wheels, the teeth of which are oppositely disposed to selectively engage said pinion gear, and means for vertically shifting said driving gear assembly to cause either of said crown wheels to engage said pinion gear.

10. Apparatus as claimed in claim 9, including means for indicating the positioning of said crown wheels.

11. A gauging device for locating the liquid-vapor interface in a receptacle, comprising a supporting channel adapted to be projected longitudinally into said receptacle through an opening in its wall, means retaining said channel in said opening, a fluid conducting tube swingably mounted at one end on the projected extremity of said channel on an axis transverse to the longitudinal axis of the latter, an inlet port in the free end of said tube, means defining a vent passageway connected to the other end of said tube and terminating in a valved vent outlet to the exterior of said receptacle, a manually operated adjusting element carried by said channel and controlled from the exterior of said receptacle, said adjusting element including a member shiftable longitudinally on said channel and having means engageable with said tube for swinging said tube on its axis, to vary its radial position within an arc which intersects both the upper and lower containing limits of the receptacle, a mechanical register located externally of the receptacle and adapted to indicate the volume of fluid being measured, and means actuated by said adjusting element simultaneously with its swinging of said sensing tube to translate the extent of movement of the sensing tube into volumetric dimensions on the register.

12. A gauging device as claimed in claim 11, wherein said manually operated adjusting element includes a shaft lying longitudinally within said channel, said vent passageway extending through said shaft to the exterior of said receptacle.

13. Apparatus as claimed in claim 12, including a sleeve threadedly engaging said shaft and adapted to shift longitudinally thereon, upon rotation of the shaft, and means carried by said sleeve engageable with said fluid conducting tube upon the shifting of said sleeve, for swinging the tube on its axis.

References Cited in the file of this patent

UNITED STATES PATENTS

| 254,369 | Puffer | Feb. 28, 1882 |
| 374,978 | Lathrop | Dec. 20, 1887 |
| 2,267,221 | Roney | Dec. 23, 1941 |
| 2,546,832 | Norway | Mar. 27, 1951 |